(12) United States Patent
Nammi et al.

(10) Patent No.: US 11,509,370 B2
(45) Date of Patent: *Nov. 22, 2022

(54) INDICATING FREQUENCY AND TIME DOMAIN RESOURCES IN COMMUNICATION SYSTEMS WITH MULTIPLE TRANSMISSION POINTS

(71) Applicant: AT&T Intellectual Property I, L.P., Atlanta, GA (US)

(72) Inventors: SaiRamesh Nammi, Kista (SE); Arunabha Ghosh, Austin, TX (US); Ralf Bendlin, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/324,355

(22) Filed: May 19, 2021

(65) Prior Publication Data

US 2021/0273696 A1 Sep. 2, 2021

Related U.S. Application Data

(63) Continuation of application No. 16/842,377, filed on Apr. 7, 2020, now Pat. No. 11,038,568, which is a (Continued)

(51) Int. Cl.
*H04B 7/0456* (2017.01)
*H04W 72/04* (2009.01)
*H04L 5/00* (2006.01)

(52) U.S. Cl.
CPC ........... *H04B 7/0486* (2013.01); *H04B 7/046* (2013.01); *H04L 5/0005* (2013.01); *H04W 72/042* (2013.01)

(58) Field of Classification Search
CPC ...... H04B 7/0486; H04B 7/046; H04B 7/024; H04L 5/0005; H04L 5/0035;
(Continued)

(56) References Cited

U.S. PATENT DOCUMENTS 10,651,906 B1 * 5/2020 Nammi ................ H04B 7/024
11,038,568 B2 * 6/2021 Nammi ................ H04B 7/046
(Continued)

OTHER PUBLICATIONS

Non-Final Office Action received for U.S. Appl. No. 16/277,541 dated Sep. 30, 2019, 16 pages.
(Continued)

*Primary Examiner* — Kenneth T Lam
(74) *Attorney, Agent, or Firm* — Amin, Turocy & Watson, LLP

(57) ABSTRACT

The technologies described herein are generally directed toward facilitating indicating frequency and time domain resources in communication systems with multiple transmission points. According to an embodiment, a system can comprise a processor and a memory that can store executable instructions that, when executed by the processor, facilitate performance of operations. The operations can include determining a first and a second transmission resource to use for transmission of a signal to a user device by, respectively, a first and a second network node. The operations can further include determining that the first and the second transmission resource comprise a same transmission resource. The operations can further include communicating, to a user equipment, a value corresponding to the first transmission resource and an indication that the first and the second transmission resource comprise the same transmission resource.

20 Claims, 14 Drawing Sheets

Related U.S. Application Data continuation of application No. 16/277,541, filed on Feb. 15, 2019, now Pat. No. 10,651,906.

(58) Field of Classification Search
CPC .. H04L 5/0094; H04L 5/0023; H04W 72/042; H04W 72/0446; H04W 72/0453
See application file for complete search history.

(56) References Cited

U.S. PATENT DOCUMENTS

| | | |
|---|---|---|
| 2014/0036858 A1 | 2/2014 | Shimezawa et al. |
| 2018/0227886 A1 | 8/2018 | Chou et al. |
| 2018/0279274 A1 | 9/2018 | Sun et al. |
| 2019/0007181 A1 | 1/2019 | Marinier et al. |
| 2019/0116594 A1 | 4/2019 | Kwak et al. |
| 2019/0174428 A1 | 6/2019 | Shao |
| 2020/0329471 A1* | 10/2020 | Zhang ................ H04W 74/08 |
| 2021/0212025 A1* | 7/2021 | Selvanesan ....... H04W 72/0446 |

OTHER PUBLICATIONS

Non-Final Office Action received for U.S. Appl. No. 16/842,377 dated Nov. 4, 2020, 35 pages.

* cited by examiner

| | PMI-FormatIndicator=widebandPMI and CQI-FormatIndicator=widebandCQI | PMI-FormatIndicator=subbandPMI or CQI-FormatIndicator=subbandCQI | | |
|---|---|---|---|---|
| | | CSI Part I | CSI Part II | |
| | | | wideband | Subband |
| 310 | CRI | CRI | | Subband differential CQI for the second TB of all even subbands |
| 320 | Rank Indicator | Rank Indicator | PMI wideband (X1 and X2) | PMI subband information fields $X_2$ of all even subbands |
| 330 | Layer Indicator | Layer Indicator | -------- | Subband differential CQI for the second TB of all odd subbands |
| 340 | PMI wideband (X1 and X2) | Wideband CQI | -------- | PMI subband information fields $X_2$ of all odd subbands |
| 350 | Wideband CQI | Subband differential CQI for the first TB | -------- | -------- |

| 410 | 420 |
| --- | --- |
| Carrier bandwidth part (PRBs) | Subband Size (PRBs) |
| < 24 | N/A |
| 24 – 72 | 4, 8 |
| 73 – 144 | 8, 16 |
| 145 – 275 | 16, 32 |

FIG. 4

| Row index 610 | dmrs-TypeA-Position 620 | PDSCH mapping type 630 | $K_0$ 640 | S 650 | L 660 |
|---|---|---|---|---|---|
| 1 | 2 | Type A | 0 | 2 | 12 |
| 2 | 3 | Type A | 0 | 3 | 11 |
| 3 | 2 | Type A | 0 | 2 | 10 |
| 4 | 3 | Type A | 0 | 3 | 9 |
| 5 | 2 | Type A | 0 | 2 | 9 |
| 6 | 3 | Type A | 0 | 3 | 8 |
| 7 | 2 | Type A | 0 | 2 | 7 |
| 8 | 3 | Type A | 0 | 3 | 6 |
| 9 | 2 | Type A | 0 | 2 | 5 |
| 10 | 3 | Type A | 0 | 3 | 4 |
| 11 | 2,3 | Type B | 0 | 9 | 4 |
| 12 | 2,3 | Type B | 0 | 10 | 4 |
| 13 | 2,3 | Type B | 0 | 4 | 4 |
| 14 | 2,3 | Type B | 0 | 6 | 4 |
| 15 | 2,3 | Type B | 0 | 5 | 7 |
| 16 | 2,3 | Type B | 0 | 5 | 2 |
| 17 | 2,3 | Type B | 0 | 9 | 2 |
| 18 | 2,3 | Type B | 0 | 12 | 2 |
| 19 | 2,3 | Type A | 0 | 1 | 13 |
| 20 | 2,3 | Type A | 0 | 1 | 6 |
| 21 | 2,3 | Type A | 0 | 2 | 4 |
| 22 | 2,3 | Type B | 0 | 4 | 7 |
| 23 | 2,3 | Type B | 0 | 8 | 4 |

| Resource allocation for TRP1 910 | Proposed bit 920 | Resource allocation for TRP2 930 |

| Joint Indication | 2nd TRP resources |
|---|---|
| 00  1030A | Same as that of first TRP in frequency and time domain |
| 01  1030B | Same as that of first TRP in frequency domain only |
| 10  1030C | Same as that of first TRP in time domain only |
| 11  1030D | Different as that of first TRP |

INDICATING FREQUENCY AND TIME DOMAIN RESOURCES IN COMMUNICATION SYSTEMS WITH MULTIPLE TRANSMISSION POINTS

RELATED APPLICATIONS

The subject patent application is a continuation of, and claims priority to each of, U.S. patent application Ser. No. 16/842,377 (now U.S. Pat. No. 11,038,568), filed Apr. 7, 2020, and entitled "INDICATING FREQUENCY AND TIME DOMAIN RESOURCES IN COMMUNICATION SYSTEMS WITH MULTIPLE TRANSMISSION POINTS," which is a continuation of U.S. patent application Ser. No. 16/277,541 (now U.S. Pat. No. 10,651,906), filed Feb. 15, 2019, and entitled "INDICATING FREQUENCY AND TIME DOMAIN RESOURCES IN COMMUNICATION SYSTEMS WITH MULTIPLE TRANSMISSION POINTS," the entireties of which applications are hereby incorporated by reference herein.

TECHNICAL FIELD

The subject application is related to wireless communication systems, and, for example, the communication of values corresponding to time and frequency domain allocations.

BACKGROUND

Using multiple input multiple output (MIMO) approaches can significantly increase the data carrying capacity of wireless systems. For these reasons, MIMO is an integral part of the 3rd and 4th generation wireless systems. 5G systems will also employ MIMO systems also called massive MIMO systems (hundreds of antennas at the Transmitter side and/Receiver side).

In some circumstances, the allocation of resources to parts of MIMO systems can cause inefficiencies, including increases in signal overhead caused by the configuration of MIMO components. Different approaches are needed to improve the efficiency of allocating resources for MIMO environments.

BRIEF DESCRIPTION OF THE DRAWINGS

The technology described herein is illustrated by way of example and not limited in the accompanying figures in which like reference numerals indicate similar elements and in which:

FIGS. 3-4 illustrate aspects of uplink and downlink channel communication, in accordance with one or more embodiments.

FIG. 6 depicts an example physical downlink shared channel (PDSCH) time domain resource allocation, in accordance with one or more embodiments.

FIGS. 9-10 illustrate different approaches that can be used by one or more embodiments to balance the competing factors described above, by for example, communicating the downlink control information described above with reduced overhead as compared to different approaches.

DETAILED DESCRIPTION

Generally speaking, one or more embodiments described herein provide mechanisms and signaling to facilitate the allocation of time and frequency domain resources in a wireless network that can employ MIMO technology.

Figure 1:
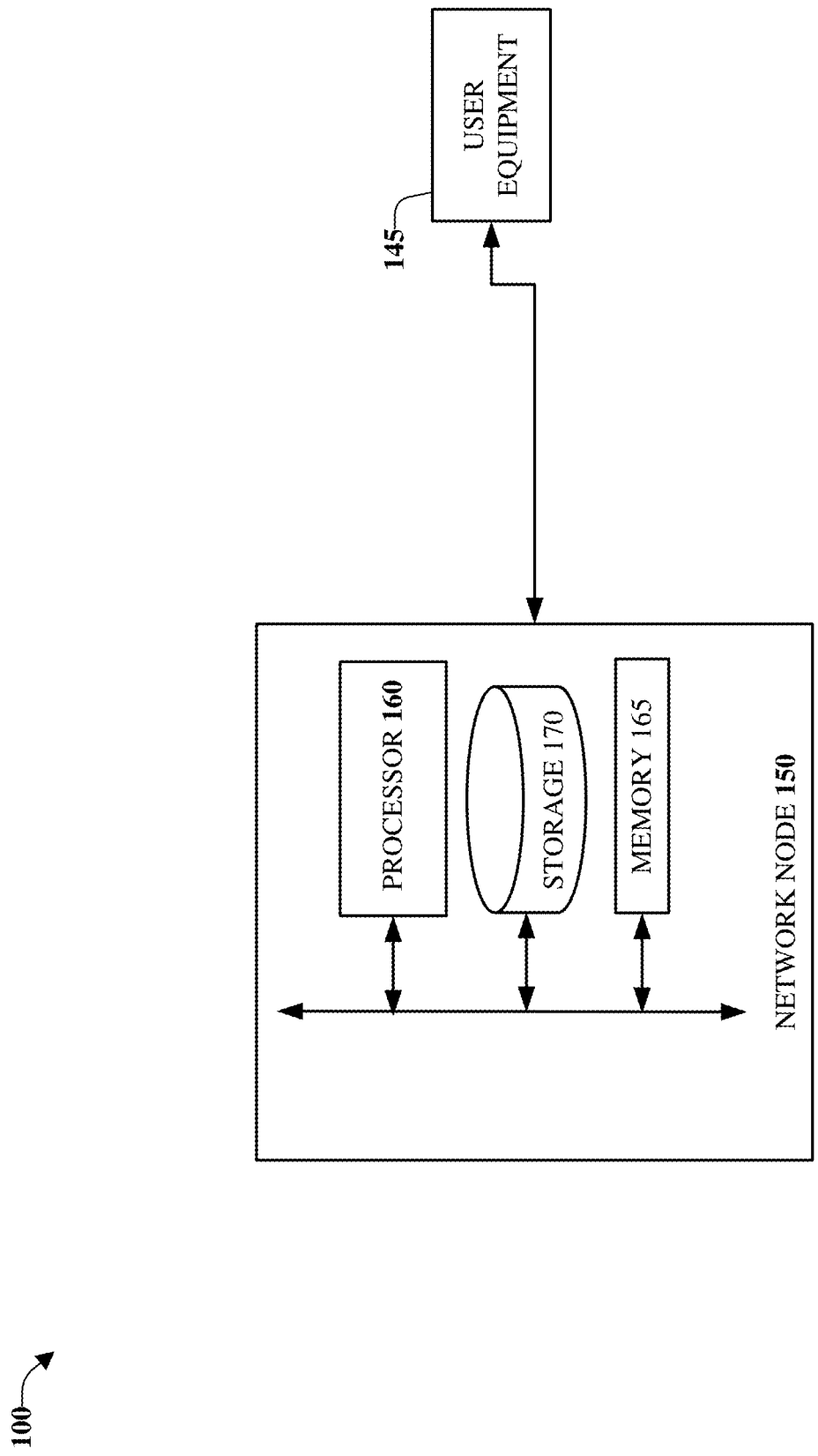
FIG. 1 illustrates an example architecture of one or more embodiments in accordance with one or more embodiments described herein.

FIG. 1 illustrates an example architecture of one or more embodiments with network node 150 communicatively coupled to user input 145. As described further with FIG. 13 below, network node 150 includes processor 160, storage 170, and memory 165. User equipment 145 is described further with FIG. 12 below.

Figure 2:
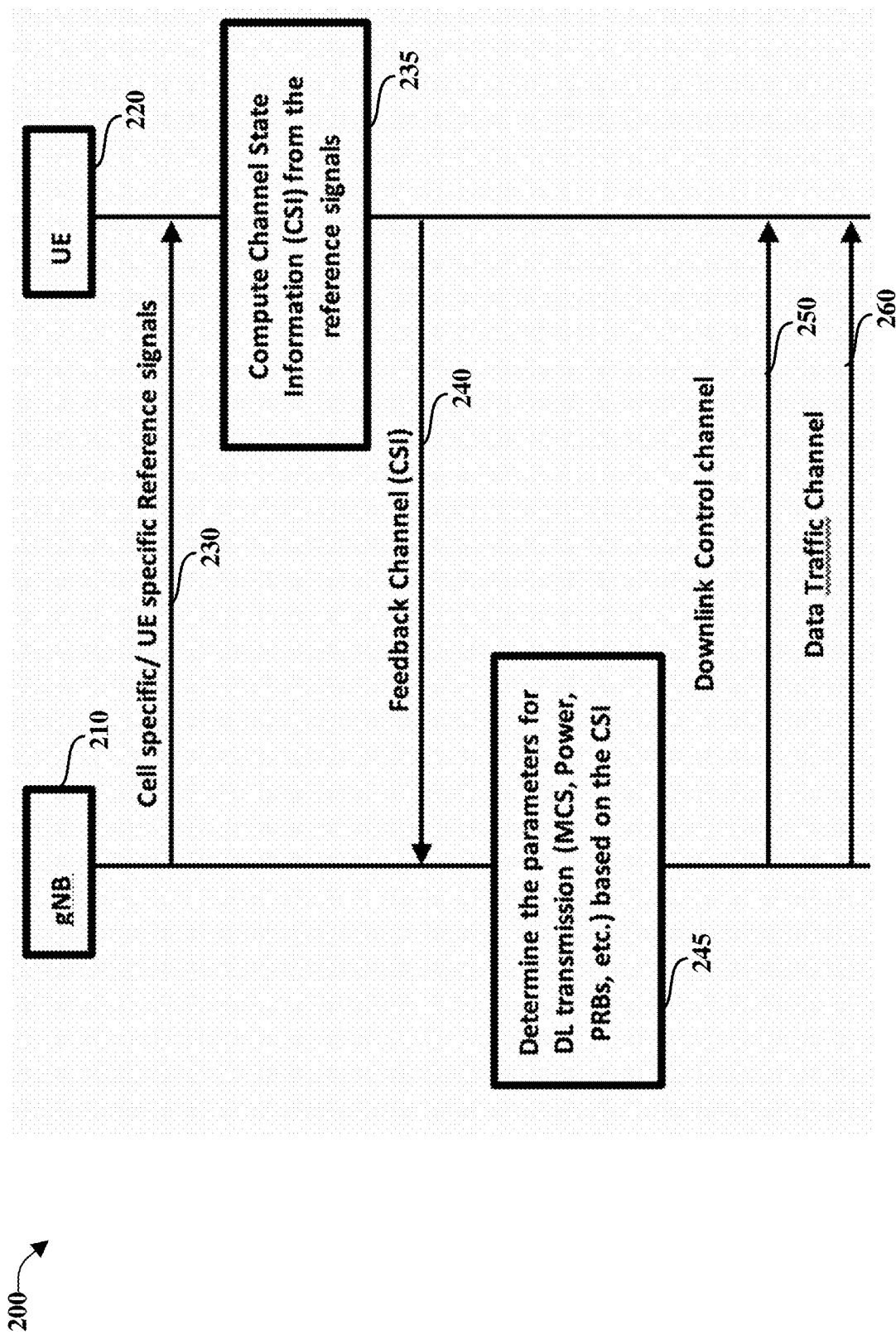
FIG. 2 is a message sequence chart that illustrates sample downlink data transfer communications between a network node (e.g., Next Generation eNodeB (gNB) 290) and UE 220, in accordance with one or more embodiments.

FIG. 2 is a message sequence chart that illustrates sample downlink data transfer communications between a network node (e.g., Next Generation eNodeB (gNB) 290) and UE 220, in accordance with one or more embodiments. For purposes of brevity, description of like elements and/or processes employed in other embodiments is omitted.

The example process can begin with gNB 210 communicating a one or more pilot or reference signals (RS) to UE 220, e.g., cell specific/UE specific reference signals 230. Downlink reference signals are predefined signals occupying specific resource elements within the downlink time-frequency grid. There are several types of downlink reference signals that are transmitted in different ways and used for different purposes by the receiving terminal. Example reference signals can include, but are not limited to, CSI reference signals (CSI-RS) and demodulation reference signals (DM-RS).

CSI reference signals (CSI-RS): can be specifically intended to be used by terminals to acquire CSI and beam specific information (beam RSRP). In 5G CSI-RS is UE specific so it can have a significantly lower time/frequency density. Demodulation reference signals (DM-RS), also referred to as UE-specific reference signals, are specifically intended to be used by terminals for channel estimation for data channels. The label "UE-specific" refers to each demodulation reference being intended for channel estimation by a single UE 210. That specific reference signal can then only be transmitted within the resource blocks assigned for data traffic channel transmission to UE 210. In one or more embodiments, there can be other types of reference signals, e.g., phase tracking and tracking and sounding reference.

Based on the one or more reference signals 230, UE 220 can compute estimates and channel state information (CSI) 235. An example CSI report can include, but is not limited to, a channel quality indicator (CQI), a precoding matrix index (PMI), rank indicator (RI), a CSI-RS Resource Indicator (CRI the same as beam indicator).

A value corresponding to the computed CSI can be communicated in a CSI report back to gNB 210, e.g., by employing feedback channel 240. This communication can be caused, for example by request from the network via gNB 210 or periodically based on a configured interval.

In one or more embodiments, a network scheduler can use CSI 235 to choose parameters for the scheduling of the particular UE 220. Parameters determined can include, but are not limited to, a modulation coding scheme (MCS), signal power, one or more embodiments, and physical resource blocks (PRBs).

Once determined, the network can send the scheduling parameters to the UE via gNB 210 by employing a downlink control channel 250. After that actual data transfer takes place from network to the UE.

FIGS. 3-4 illustrate aspects of uplink and downlink channel communication, in accordance with one or more embodiments. For purposes of brevity, description of like elements and/or processes employed in other embodiments is omitted.

In one or more embodiments, the uplink control channel carries information about hybrid automatic repeat request (HARQ-ACK) information corresponding to the downlink data transmission, and channel state information. In one approach, CSI 235 can be divided into two categories: One for subband and the other is for wideband. The configuration of subband or wideband CSI reporting can be done through radio resource control (RRC) signaling as part of a CSI reporting configuration. FIG. 3 depicts an example of contents of a CSI report for wideband CDI reporting (e.g., PMI format indicator=Wideband, CQI format indicator=wideband), and subband CSI reporting (e.g., PMI format=subband, CQI format=subband). The example report includes a channel quality indicator (CQI) 350, a precoding matrix index (PMI) 340, rank indicator (RI) 320, a CSI-RS (CRI) resource indicator 310. It should be noted that for the NR example, a subband is defined according to the bandwidth part of the OFDM in terms of PRBs as shown in Table 2. The subband configuration is also done through RRC signalling.

The downlink control channel (PDCCH) carries information about the scheduling grants. Typically, this consist of number of MIMO layers scheduled, transport block sizes, modulation for each codeword, parameters related to HARQ, sub band locations etc. Note that, all DCI formats may not use transmit all the information as shown above. In general, the contents of PDCCH depends on transmission mode and DCI format.

In an example, the information can be transmitted by means of the downlink control information (DCI) format can include, but is not limited to, a carrier indicator, an identifier for DCI formats, a bandwidth part indicator, a VRB-to-PRB mapping flag, a PRB bundling size indicator, a rate matching indicator, a ZP CSI-RS trigger, Modulation and coding scheme for each TB, New data indicator for each TB Redundancy version for each TB, a HARQ process number, a Downlink Assignment Index, a TPC command for uplink control channel, as PUCCH resource indicator, a PDSCH-to-HARQ feedback timing indicator, antenna port numbers, transmission configuration indication, an SRS request, CBG transmission information, CBG flushing out information, and DMRS sequence initialization.

Figure 5:
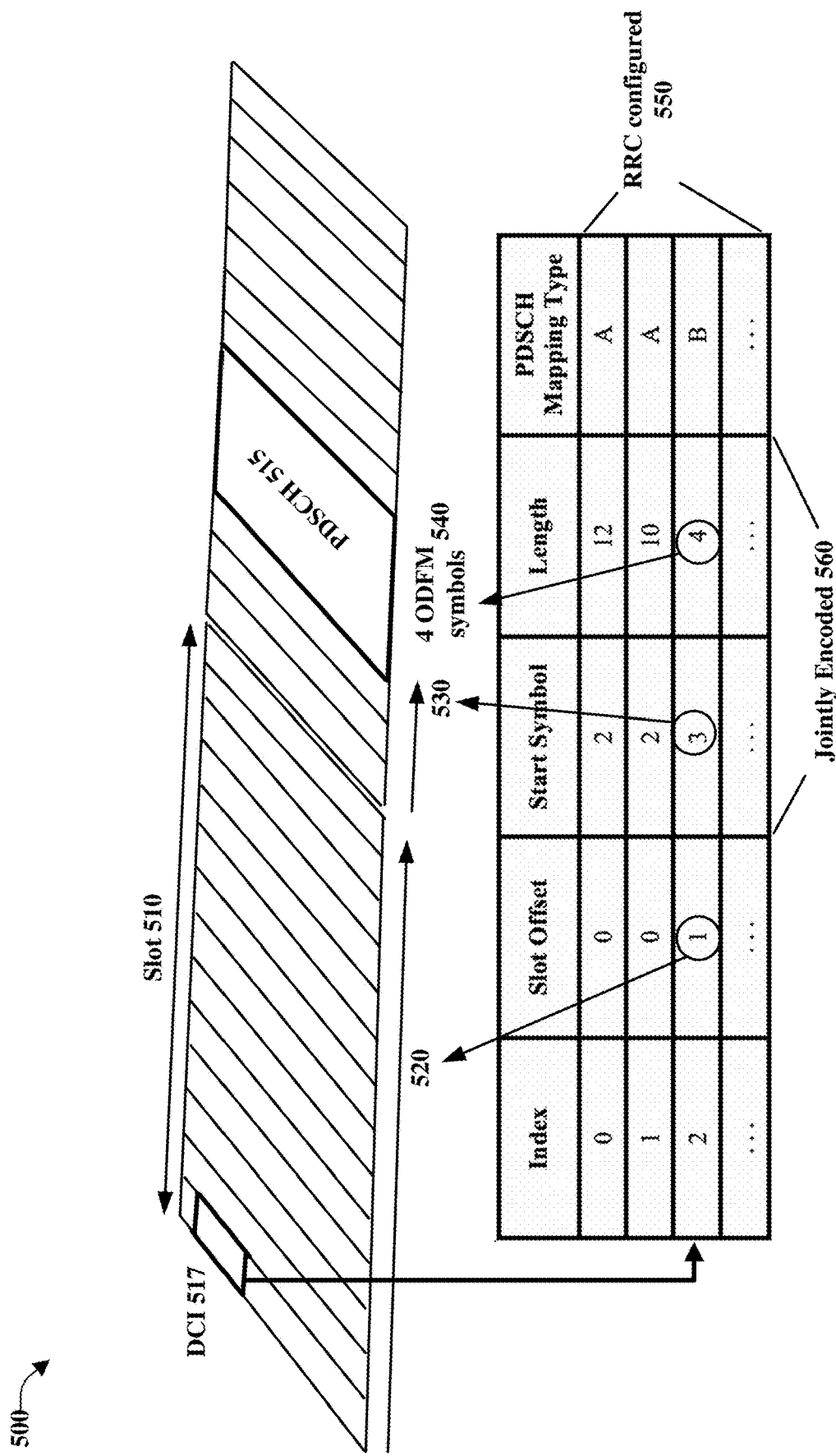
FIG. 5 illustrates an example time domain resources allocation field in the DCI, in accordance with one or more embodiments.

Additional information that can be communicated to a UE by employing the DCI format include a frequency domain resource assignment and a time domain resource assignment, FIG. 5 illustrates an example time domain resources allocation field in the DCI, in accordance with one or more embodiments. For purposes of brevity, description of like elements and/or processes employed in other embodiments is omitted.

As mentioned above in DCI can contain frequency domain and time domain allocation for data to be transmitted. One approach to encoding this information in the DCI can separately signal the slot number, the starting OFDM symbol, and the number of OFDM symbols used for transmission. In an alternative approach that can reduce a potentially unnecessarily large number of bits used for encoding, an approach can be used that is based on configurable tables. As depicted in FIG. 5, in this approach, the time domain resources allocation field in the DCI can be used as an index into an RRC configured table from which the time-domain allocation can be obtained.

FIG. 6 depicts an example physical downlink shared channel (PDSCH) time domain resource allocation, in accordance with one or more embodiments. For purposes of brevity, description of like elements and/or processes employed in other embodiments is omitted.

For example, as shown, up to 16 rows 610 can be configured where each row contains: A slot offset 620, that is the slot relative to the one where the DCI was obtained, the first OFDM symbol 650 in the slot where the data are transmitted (including DMRS), and the length (L) of the transmission in number of OFDM symbols in the slot.

Figure 7:
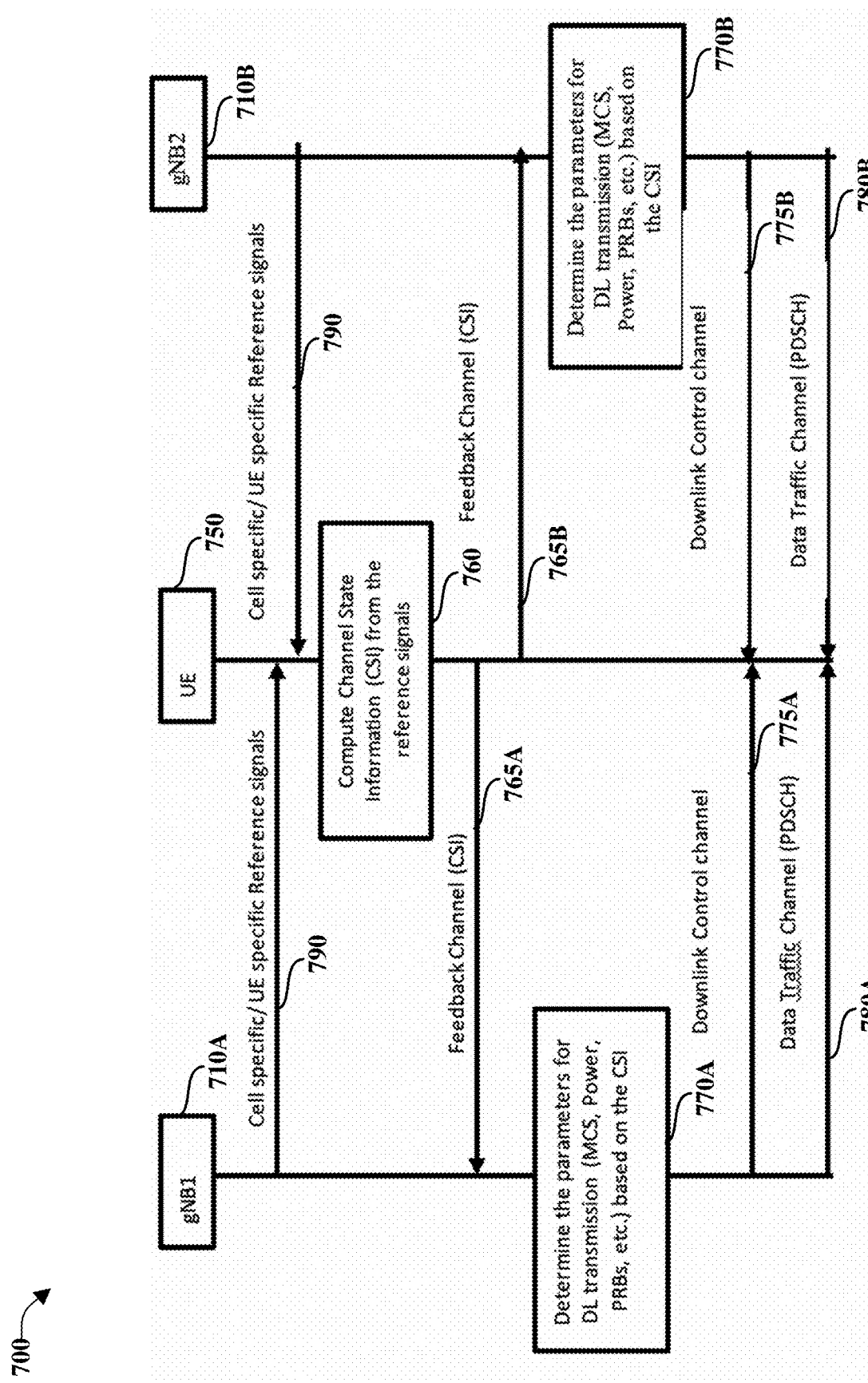
FIG. 7 depicts a message sequence chart that illustrates sample frequency domain resource allocation in downlink data transfer communications between each two network nodes (e.g., Next Generation eNodeBs (gNB) 710A-B) and UE 750, in accordance with one or more embodiments.

The specific example of FIG. 7 shows the time domain resource allocation for allocation A (the table is configured by RRC signalling) and the DCI indicates the row index 610 of the table contents. For example, if the index is equal to 1, then the DMRS location (e.g., slot offset 620) starts from the second symbol (the zero and first symbol are allocated to PDCCH in this row index 610), the PDSCH starts from S=2 (650) symbol (including DMRS) and the length of the PDSCH is equal to length 660 (L)=12 OFDM symbols.

FIG. 7 depicts a message sequence chart that illustrates sample frequency domain resource allocation in downlink data transfer communications between each two network nodes (e.g., Next Generation eNodeBs (gNB) 710A-B) and UE 750, in accordance with one or more embodiments. For purposes of brevity, description of like elements and/or processes employed in other embodiments is omitted.

In this example, gNBs 710A-B can also be termed transmission reception points (TRPS). In the TRP example, the reception points can be different antennas in the same device, not different devices as discussed thus far.

As noted above, FIG. 7 depicts a downlink data transfer with multiple transmission points. In this approach, a procedure similar to the procedure described with FIG. 2 above can be repeated for the second TRP. However, in an exemplary embodiment, when the TRPs are co-located with multiple panels or the connecting link between the TRP is ideal backhaul, then the scheduling can be optimized by using a single DCI. The details of this single DCI for two TRPs approach are described in detail below.

The frequency domain resource allocation field can indicate the resource blocks on one component carrier upon which the device should receive the PDSCH. In one or more embodiments, the size of the field can depend on the size of the bandwidth and the resource allocation type, Type 0 and Type 1. Type 0 is a bitmap based allocation scheme. In an example where the number of resource blocks is equal to 100, then a bit map of length equal to 50 (assuming RBG=2 consecutive RB) can be transmitted by setting the locations where the resources are allocated. This can be a flexible method of indicating resources, however the payload size can be significant, especially when the allocated bandwidth is very high. In Type 1, instead of explicitly indicating the exact RB locations, the network can indicate the start position and the length of the resource blocks.

Figure 8:
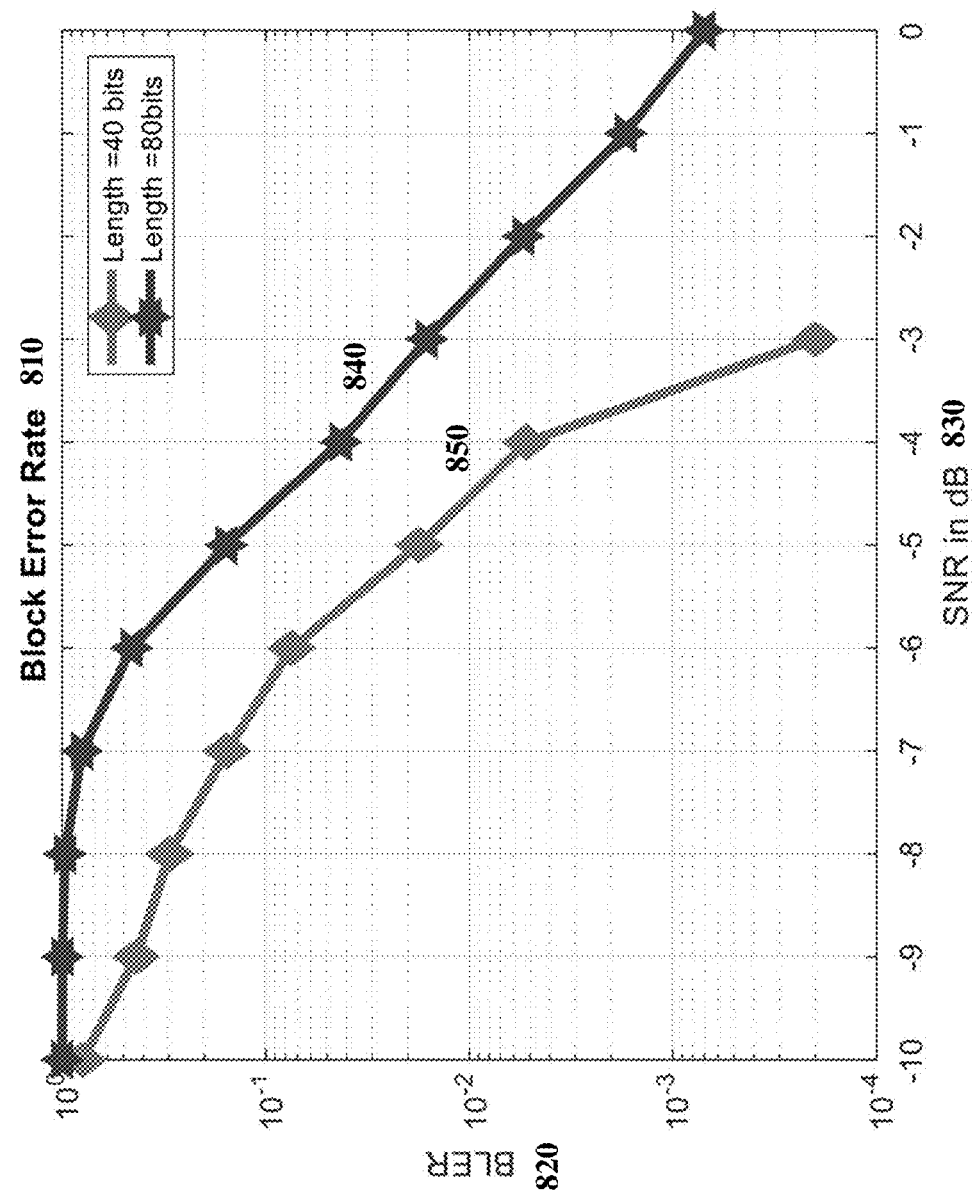
FIG. 8 is an illustrative chart that compares a DCI length to a block error rate (BLER), in accordance with one or more embodiments.

FIG. 8 is an illustrative chart that compares a DCI length to a block error rate (BLER), in accordance with one or more embodiments. For purposes of brevity, description of like elements and/or processes employed in other embodiments is omitted.

One or more embodiments, with multiple transmission points, using a single downlink control channel to indicate the time domain and frequency resources can improve performance, but only if DCI length can be maintained at a consistent or lower level for many instances. Stated differently, although performance can be improved by using multiple transmission points, this use can, in some circumstances cause DCI length to increase, with detrimental results shown in FIG. 8 outweighing other performance gains.

In one or more embodiments, a different control channel design is used for multiple transmission points as compared to the approach used for a single transmission point. It should also be noted that, one or more embodiments can also maintain accurate control channel reception with different approaches, with inaccuracies in this area caused by different encoding approaches potentially outweighing the other performance benefits noted above. In some circumstances, the control channel designs described herein can improve DCI channel encoding, e.g., time domain and frequency resources for a UE and multiple network nodes 210.

Accurate control channel reception can improve performance when decoding data traffic channels. Because the two TRPs can schedule resources independently and have different scheduling values, in one approach, the downlink control channel uses separate fields for indicating the resources from each of the two TRPs. While this approach can improve accuracy, this approach can also increase the payload of the PDCCH, thus reducing the performance achieve, as discussed above with FIG. 8.

One way that can be used to improve the performance of the downlink control channel is to use more parity bits or increase the aggregation levels. This approach also has the potential to improve performance, with performance enhancements being outweighed by performance detriments caused by the approach. One reason this can occur is that increasing reliability by adding more parity bits can increase the signaling overhead of the control channel, which can cause the number of resource elements needed for data transmission to be less. This reduction can, in turn, reduce the throughput and the capacity a system that can use multiple transmission points, e.g., the NR system discussed above.

FIGS. 9-10 illustrate different approaches that can be used by one or more embodiments to balance the competing factors described above, by for example, communicating the downlink control information described above with reduced overhead as compared to different approaches.

In some circumstances, using the approaches described herein can achieve the advantages described below. Because, one or more embodiments can balance the above factors, one or more embodiments can achieve increase efficiency in the use of power. Because one or more embodiments can improve power efficiency, the power required for transmitting downlink control channel information can be minimized. This improvement in data transmission power can further improve link and system throughput.

Although the present disclosure uses some examples of downlink data transmission for multi-TRP systems, these examples are non-limiting, and one having skill in the relevant art, given the description herein, would appreciate that one or more embodiments described herein can be used uplink and side-link systems as well.

It should be noted that, for some examples discussed herein, the terms radio network node, network, gNB, and TRP can refers to any type of network node that serves a UE and/or is connected to other network node, network element, or any radio node from which a UE can receive a signal. Examples of radio network nodes include, but are not limited to, Node B, base station (BS), multi-standard radio (MSR), MSR BS, gNB, eNode B, network controller, radio network controller (RNC), base station controller (BSC), relay, donor node controlling relay, base transceiver station (BTS), access point (AP), transmission points, transmission nodes, RRU, RRH, and nodes in distributed antenna system (DAS).

Similarly, it should also be noted that the term user equipment (UE) can refer to any type of wireless device that communicates with a radio network node in a cellular or mobile communication system. Examples of UE include, but are not limited to, a target device, a device to device (D2D) UE, a machine type UE, UE capable of machine to machine (M2M) communication, a PDA, a tablet, a mobile terminal, a smart phone, a laptop embedded equipped (LEE), laptop mounted equipment (LME), and USB dongles.

It should also be noted that embodiments described herein can be applicable to single carrier as well as to multicarrier (MC) or carrier aggregation (CA) operation of a UE, in conjunction with MIMO, in which the UE can receive and/or transmit data to more than one serving cell using a MIMO technique. The term carrier aggregation (CA) can also be termed herein a "multi-carrier system," a "multi-cell operation," a "multi-carrier operation," and "multi-carrier" transmission and/or reception.

As described with FIG. 9 below, in a first group of embodiments, a first network node can indicate to a UE the resource allocations determined for a second network mode, based on the resource allocation to the first network node. In a second group of embodiments, the network can indicate to a UE the time domain resource allocations determined for a second network mode, based on the resource allocation to the first network node. In a third group of embodiments, the network can indicate to a UE the frequency domain resource allocation of the second network node based on the resource allocation of the first network node.

FIG. 9 depicts an arrangement of bits for a time and frequency domain resource allocation for one or both TRPs, along with indicator bit(s) to specify different relationships between the two allocations. For purposes of brevity, description of like elements and/or processes employed in other embodiments is omitted.

In this example, it is important to note that, as described below, resource allocation for TRP2 930 can be omitted in some circumstances, thus reducing the overall size of the bit allocation. It should be noted that one or more embodiments can be applicable for different control channel configurations, including, but not limited to, a single downlink control channel from the gNB from either from the first TRP or second TRP or from both the TRPs.

Generally speaking, in one or more embodiments, instead of using separate fields for resource allocations, in some circumstances (e.g., when the resource allocations for both the first and the second TRP are the same), instead of using two fields to include both resource allocation values, one field can be used for one of the allocations, an indicator can be included (e.g., a single bit in some examples) that can indicate to the UE that the one field contains both resource allocations. Because, in some circumstances (e.g., with a single PDCCH design), the two TRPs either can use a single scheduler or the two schedulers can be coordinated, and because of this, frequently, the time and frequency domain resources allocated to each TRP is the same.

In an example, a number of bits allocated for frequency domain resource allocation is 40 bits and time domain resource allocation is 4 bits, for the first TRP. By one approach, e.g., using a field for each TRP, the number of bits required to indicate the frequency domain resource allocation is 40+40 bits and time domain resource allocation is 4+4 bits.

In an alternate example (e.g., where a single scheduler is used), the resources determined for each TRP by the scheduler are the same. In contrast to the example above where 88 bits are allocated for time and frequency resource allocation, in this example, 40 bits can be allocated for the common frequency domain allocation and 4 bits for the common time domain resource allocation. As noted above, in this example, an indicator can be included with the 44 bits (e.g., one bit) to indicate to the UE that both allocations are the same, e.g., 45 bits as compared to 88 without using this approach.

In a variation of this example, when a shared scheduler determines different time and frequency domain resources for the TRPs, the 88 bits from the previous example can be used, along with the additional bit to indicate the two TRP resource allocations are different, e.g., 89 bits allocated for the allocations, but, as noted above, in some circumstances this can be a less frequent occurrence and the average bits used will be lower. As noted above, this lower amount of overhead, combined with the MIMO use of two TRPs can, in some circumstances, be an improvement over other approaches.

It is important to note that, in one or more embodiments, the bits that specify the time and frequency allocations can be communicated to the UE using one channel of communication, while the indicator (e.g., the single bit described above) can be communicated using a different channel, e.g., the network can use a single bit communicated to the UE via RRC signaling to specify the indicator. In an example, the indicator is sent on a channel at a higher level, e.g., on the OSI network hierarchy, than the other communicated information. In an example, the indicator can be communicated using an RRC layer of communication and the DCI can be communicated on the lower L1/L2 layer.

FIG. 10 depicts a variation of the approach described above where the network can indicate to a UE the time domain resource allocations determined for a second network mode, based on the resource allocation to the first network node, or the network can indicate to a UE the frequency domain resource allocations determined for a second network mode, based on the resource allocation to the first network node. For purposes of brevity, description of like elements and/or processes employed in other embodiments is omitted.

In this illustrative example, when a scheduler, instead of determining the same resource allocations for both time and frequency domains, can determine that the TRPs share one of the two domains, e.g., both TRP1 and TRP2 share the same time domain allocation, but have different frequency allocations, or TRP1 and TRP2 share the same frequency domain allocation, but have different time allocations.

In this example, an indicator can also be used, but, because there is a higher number of potential circumstances, the size of the indicator can be different. In an example, as depicted in FIG. 10, a table is shown with a two-bit indicator 1010 that corresponds to the four different possible circumstances of this example. Thus, in the example variations described above, with the same 40+4 bit allocations, when time domain allocations differ between the TRPs but the frequency domain allocation is the same, 40 bits ca be allocated for the common frequency domain, 2 bits are allocated for the indicator 1030B (e.g., 01) and 8 bits can be allocated for the two different time domain allocations, e.g., 50 bits total, as compared to the 88 bits required without this approach. Upon receiving this encoded set of bits, the UE can be configured to decode the information based on the bit allocations described above.

Similarly, in an example where there is a different frequency domain allocations but a common time domain allocation between the two TRPs, 40+40 bits can be allocated for the different frequency domain allocations, 2 bits for the indicator 1030C (e.g., 10), and four bits for the common time resource allocation, e.g., 86 bits total, as compared to the 88 bits that can be required without this approach. It can be noted based on FIG. 10, that the circumstances described in the first indicator example described above with FIG. 9 (with two different possible circumstances available) can, with the addition of the additional bit, be handled by the embodiments discussed with FIG. 10.

In a variation of both the FIG. 9 and FIG. 10 embodiments (e.g., embodiments that can use indicators to specify bit allocations and common values), in one or more embodiments the UE receiving the indicators can reduce the number of bits required by the above examples but handling these indicators as semi-static. For example, returning to the example of FIG. 9, where both the time and frequency domains are the same and a one bit indicator is used, a UE can be configured to receive and decode the full 40+4+1 bit specifier (e.g., frequency+time+indicator), but for subsequently received allocations, the UE can decode the allocation bits described above with an omission of the indicator bit, e.g., 40+4.

The above assumption of the indicator can last until configurable events occur, e.g., a period of time elapses, a signal is received (e.g., a paging signal) or other similar ways that a UE can be notified that semi-static values are changing. Once the event occurs, the UE can expect to have to decode the indicators until other conditions occur. It should also be noted that, this approach can be commenced based on the value of an indicator decoded, e.g., if the time and frequency domains are the same, then this is assumed, but if the time and frequency domains are different (e.g., the maximum bits described above), then indicators can continue being sent and decoded until a different circumstance occurs. It is important to note that this semi-static approach described with the single-bit indicators of the FIG. 9 examples, can also be applied to the two-bit FIG. 10 examples, e.g., potentially having an increased benefit of omitting a larger bit-length indicator in some circumstances.

It should also be noted that many of the characteristics of the embodiments described above, including, but not limited to, the number of TRPs that can be handled by these approaches, the bit lengths specified for the time and frequency domain elements, and the bit lengths of the different indicators. For example, the principles of one or more embodiments described above can be applied to an example where the allocated resources of four TRPs are compared, and a longer indicator can specify what combinations of allocations match and don't match, thereby reducing the number of bits required in a fashion similar to the approaches described above. It is further important to note that, the principles of embodiments described herein are not limited only to two components or even these particular components (e.g., time and frequency domains). One having skill in the relevant arts, given the descriptions herein, would appreciate that the approaches described herein can apply to different communications channels, and different values as well.

Figure 11:
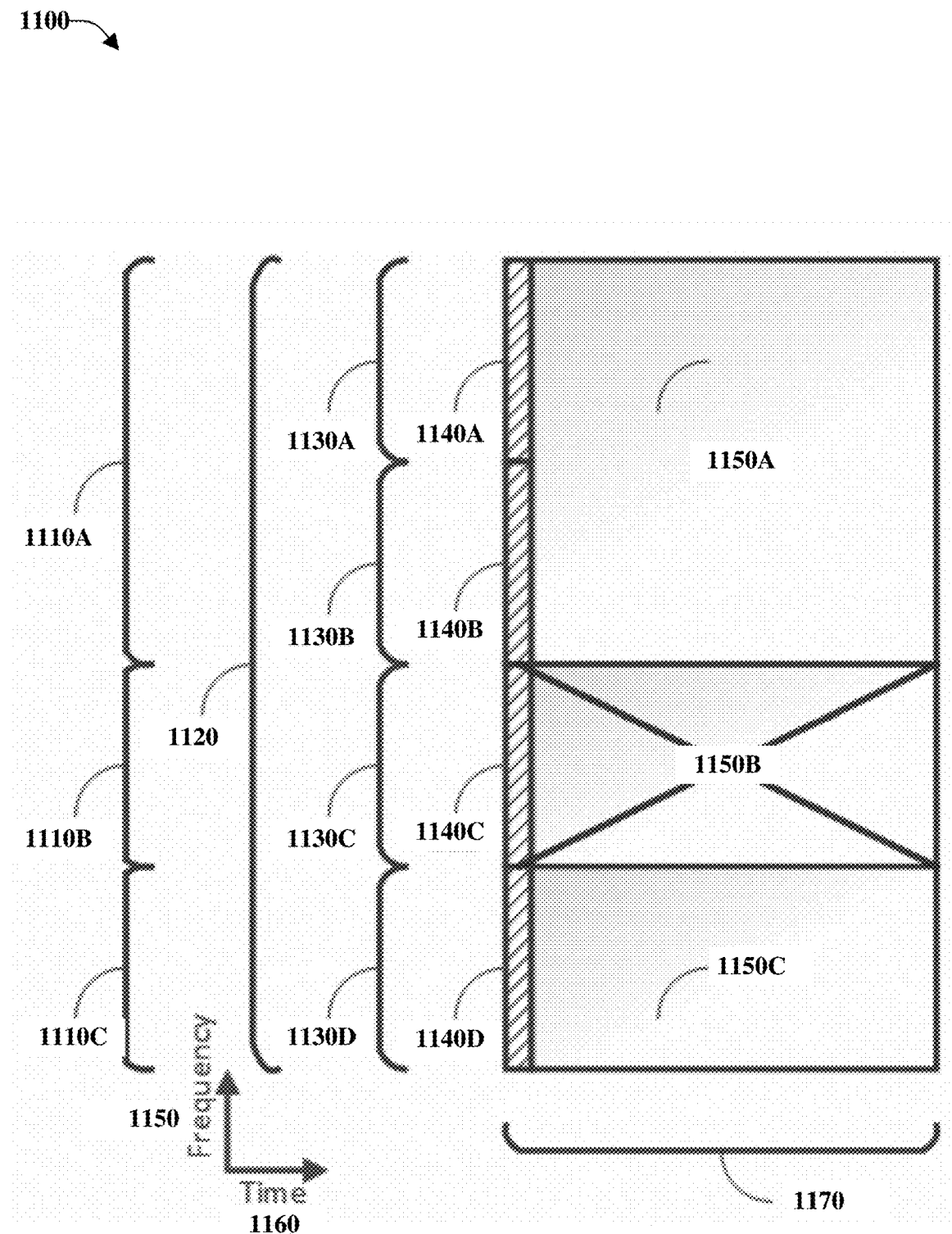
FIG. 11 illustrates an embodiment with resource allocation for a single TRP that can utilize some of the approaches described above to improve performance, in accordance with one or more embodiments.

FIG. 11 illustrates an embodiment with resource allocation for a single TRP that can utilize some of the approaches described above to improve performance, in accordance with one or more embodiments. For purposes of brevity, description of like elements and/or processes employed in other embodiments is omitted.

As depicted in FIG. 11, in one or more embodiments, instead of two TRPs with resource allocations, there are two continuous parts 1110A and 1110C of a carrier 1120. In this example, carrier 1120 can be deployed as unlicensed spectrum. Hence, in some circumstances, the transmitter has to perform a clear channel assessment (CCA) before it can transmit using this carrier.

In one or more embodiments, CCA can be performed in subbands 1130A, 1130B, 1130C, and 1130D. For any given subband, in some circumstances as part of the CCA procedure, the transmitter may find that the given subband is occupied by another transmitter or idle.

Whether a given subband is occupied or idle is determined by comparing the received power within a defined time interval against a threshold, and if the received power is below this threshold, the subband is considered idle, otherwise it is considered occupied. In the example depicted in FIG. 11, the transmitter finds subband 1130C occupied and subbands 1130A 1130B, and 1130D idle.

Based on these results, in this example, the latter three subbands can be used for transmission. A common control channel can be transmitted at the beginning of the transmission in 1140A, 1140B, 1140C, and 1140D indicating which subbands 1130A, 1130B, 1130C, and 1130D are busy (e.g., 1130C) and idle (1130A, 1130B, and 1130D).

A UE specific control channel may then schedule transmissions in the contiguous regions 1110A and 1110C using the embodiments herein. Specifically, instead of two TRPs described above, the two transmissions of the same TRP are depicted in two contiguous regions 1110A and 1110C of the carrier 1120.

The proposed solutions herein can reduce the control overhead because the time domain resource allocation for each contiguous region 1110A and 1110C is identical whereas the frequency domain resources 1110A and 1110C are not. Based in the approaches above, signals overhead using the UE specific control channel noted above can be reduced in a similar way as describe above with the two TRPs. Similar performance improvements can also be achieved.

Figure 12:
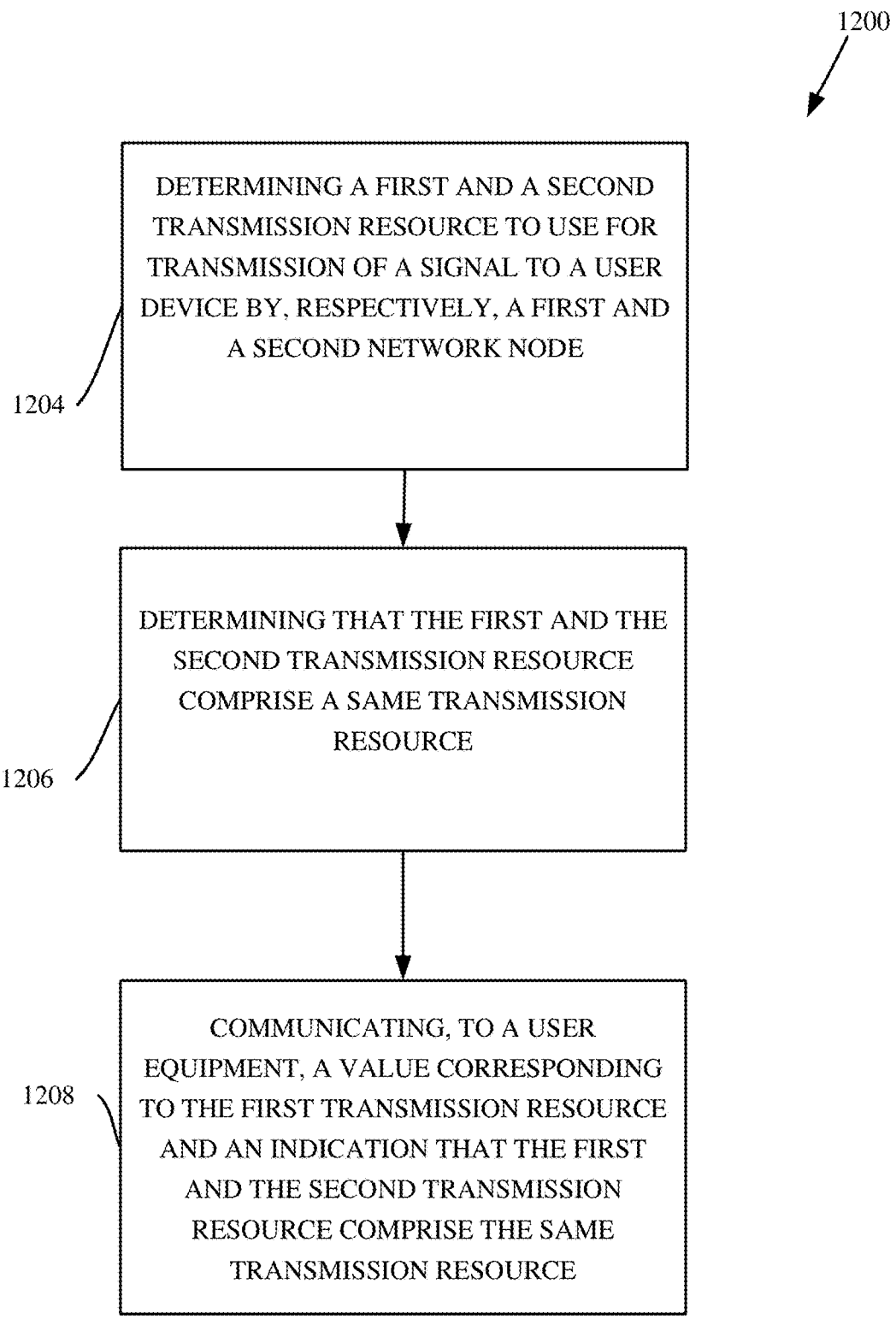
FIG. 12 illustrates a flow diagram of an example method, in accordance with one or more embodiments.

FIG. 12 illustrates a flow diagram of an example method 1200, in accordance with one or more embodiments. For purposes of brevity, description of like elements and/or processes employed in other embodiments is omitted.

At 1204, the method determines a first and a second transmission resource to use for transmission of a signal to a user device by, respectively, a first and a second network node. At 1206, the method determines that the first and the second transmission resource comprise a same transmission resource. At 1208, the method communicates, to a user equipment, a value corresponding to the first transmission resource and an indication that the first and the second transmission resource comprise the same transmission resource.

Figure 13:
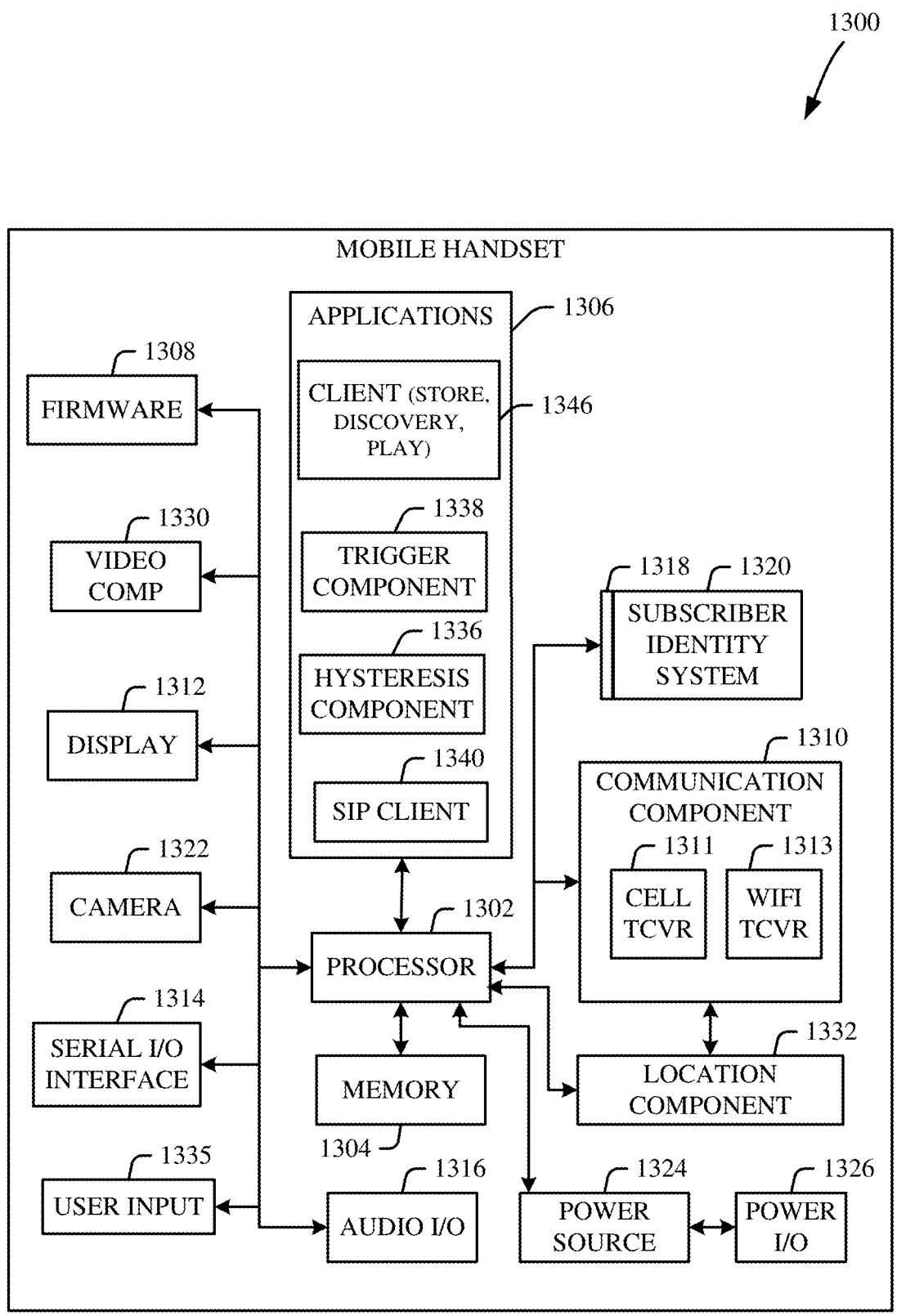
FIG. 13 illustrates an example block diagram of an example mobile handset operable to engage in a system architecture that can facilitate processes described herein, in accordance with one or more embodiments.

FIG. 13 illustrates is an example block diagram of an example mobile handset 1300 (e.g., an example user equipment 145) operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

As can be seen, the technology described herein can provide increased robustness and reduced latency of initial access and V2X configuration when control plane and mobility signaling is provided over a sub6-GHz anchor link via multi-connectivity, (compared to a standalone architecture), in which V2X-capable UEs provide initial access, IDLE mode, control plane, and mobility functionality. The technology can facilitate reduced overhead on mmWave backhaul links multiplexing cellular and V2X traffic (of one or more bands) by utilizing sub 6-GHz channels for control plane signaling instead of multiplexing both control and data links on mmWave bands. Still further, the technology described herein provides the ability to efficiently perform local manager configuration and association based on measurements/reports related to sidelink link quality metrics over sub6-GHz channels more efficiently than over the NR mmWave backhaul links. The technology described herein enables support for simultaneous cellular communication with a network infrastructure, in addition to V2X direct communication services on the same or different carriers.

In example implementations, user equipments are able to send and/or receive communication data via a wireless link to the network device. Wireless communication system 200 can thus include one or more communication service provider networks that facilitate providing wireless communication services to various user equipments via the network device and/or various additional network devices (as is understood) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud-based networks, and the like. For example, in at least one implementation, system 100 can be or include a large-scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

The network device can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

The wireless communication system can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of systems described herein are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general-purpose computing mechanism described below with reference to FIG. 14 is but one example of a computing device.

Figure 14:
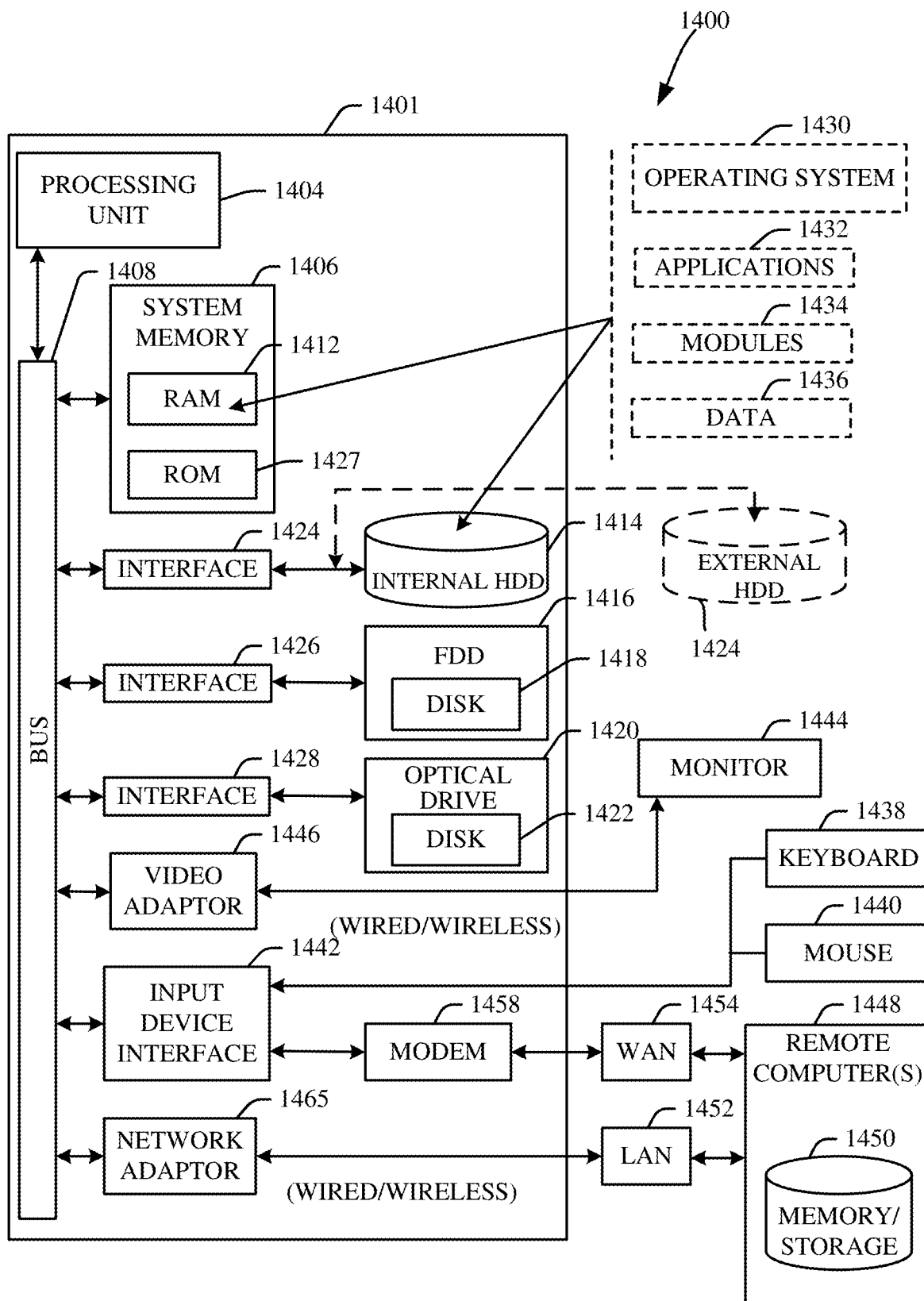
FIG. 14 illustrates an example block diagram of an example computer operable to engage in a system architecture that can facilitate processes described herein, in accordance with one or more embodiments.

In order to provide a context for the various aspects of the disclosed subject matter, FIG. 14 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1420 (see below), non-volatile memory 1422 (see below), disk storage 1424 (see below), and memory storage 1446 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 14 illustrates a block diagram of an operating environment 1400 operable to execute the disclosed systems and methods in accordance with an embodiment. Computer 1412, which can be, for example, part of the hardware of system 1420, includes a processing unit 1414, a system memory 1416, and a system bus 1418. System bus 1418 couples system components including, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1416 can include volatile memory 1420 and nonvolatile memory 1422. A basic input/output system (BIOS), containing routines to transfer information between elements within computer 1412, such as during start-up, can be stored in nonvolatile memory 1422. By way of illustration, and not limitation, nonvolatile memory 1422 can include ROM, PROM, EPROM, EEPROM, or flash memory. Volatile memory 1420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 can also include removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 14 describes software that acts as an intermediary between users and computer resources described in suitable operating environment 1400. Such software includes an operating system 1428. Operating system 1428, which can be stored on disk storage 1424, acts to control and allocate resources of computer 1412. System applications 1430 take advantage of the management of resources by operating system 1428 through program modules 1432 and program data 1434 stored either in system memory 1416 or on disk storage 1424. It is to be noted that the disclosed subject matter can be implemented with various operating systems or combinations of operating systems.

A user can enter commands or information into computer 1412 through input device(s) 1436. As an example, a mobile device and/or portable device can include a user interface embodied in a touch sensitive display panel allowing a user to interact with computer 1412. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1414 through system bus 1418 by way of interface port(s) 1438. Interface port(s) 1438 include, for example, a serial port, a parallel port, a game port, a universal serial bus (USB), an infrared port, a Bluetooth port, an IP port, or a logical port associated with a wireless service, etc. Output device(s) 1440 and a move use some of the same type of ports as input device(s) 1436.

Thus, for example, a USB port can be used to provide input to computer 1412 and to output information from computer 1412 to an output device 1440. Output adapter 1442 is provided to illustrate that there are some output devices 1440 like monitors, speakers, and printers, among other output devices 1440, which use special adapters. Output adapters 1442 include, by way of illustration and not limitation, video and sound cards that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, cloud storage, cloud service, a workstation, a microprocessor-based appliance, a peer device, or other common network node and the like, and typically includes many or all of the elements described relative to computer 1412.

For purposes of brevity, only a memory storage device 1446 is illustrated with remote computer(s) 1444. Remote computer(s) 1444 is logically connected to computer 1412 through a network interface 1448 and then physically connected by way of communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, one or more embodiments is not to be limited to any single implementation, but rather is to be construed in breadth, spirit and scope in accordance with the appended claims.

What is claimed is:

1. A method, comprising:
   facilitating, by a system comprising a processor, identifying a first transmission resource in a first frequency domain of a carrier and a second transmission resource in a second frequency domain of the carrier; and
   scheduling, by the system, a transmission by a user equipment comprising transmitting a communication to the user equipment, the communication comprising:
   a first value corresponding to the first frequency domain and a second value corresponding to the second frequency domain, and
   a first indication that the first and the second transmission resource are comprised in a same time domain.

2. The method of claim 1, wherein facilitating the identifying of the first and the second transmission resources comprises determining that the first transmission resource is available for use by the user equipment and that the second transmission resource is unavailable for use by the user equipment.

3. The method of claim 2, further comprising, determining, by the system, that the carrier is deployed in an unlicensed spectrum, wherein the determining that the first transmission resource is available for use is initiated based on the determining that the carrier is deployed in the unlicensed spectrum.

4. The method of claim 2, wherein the determining that the first transmission resource is available is based on a result of performing a clear channel assessment process that determines whether subbands of the carrier are idle or already occupied by a different transmitter other than a transmitter of the user equipment to use for the transmission, and based on a subband of the subbands associated with the first transmission resource being determined to be idle by the clear channel assessment process.

5. The method of claim 2, wherein the communication further comprises a second indication that the first transmission resource is available.

6. The method of claim 5, wherein the second indication that the first transmission resource is available indicates that the first transmission resource is idle.

7. The method of claim 2, wherein the communication further comprises a second indication that the second transmission resource is unavailable.

8. The method of claim 7, wherein the second indication that the second transmission resource is available indicates that the first transmission resource is idle.

9. The method of claim 1, wherein transmitting the communication to the user equipment comprises transmitting the communication via a radio resource control channel.

10. The method of claim 1, wherein transmitting the communication to the user equipment comprises transmitting the communication via a downlink control channel.

11. First network equipment, comprising:
    a processor; and
    a memory that stores executable instructions that, when executed by the processor, facilitate performance of operations, comprising:
    identifying a first transmission resource in a first frequency domain and a second transmission resource in a second frequency domain,
    communicating, to second network equipment, transmission resource information corresponding to the first transmission resource and the second transmission resource, and
    receiving a first indication from the second network equipment that a mobile device received a communication comprising the transmission resource information and a second indication that the first and the second transmission resource are comprised in a same time domain.

12. The first network equipment of claim 11, wherein the identifying of the first and the second transmission resources comprises determining that the first transmission resource is available for use and that the second transmission resource is unavailable for use.

13. The first network equipment of claim 12, wherein the identifying of the first and the second transmission resources comprises identifying that the first transmission resource and the second transmission resource are deployed in an unlicensed spectrum, and wherein the determining that the first transmission resource is available for use is initiated based on the first transmission resource and the second transmission resource being determined to be deployed in the unlicensed spectrum.

14. The first network equipment of claim 12, wherein the determining of the first transmission resource is available is performed via a clear channel assessment process that determines that a received power corresponding to the transmission resource for a defined period is less than a threshold received power.

15. The first network equipment of claim 12, wherein the communication further comprises a third indication that the first transmission resource is available.

16. The first network equipment of claim 11, wherein the communication to the mobile device was sent via a downlink control channel.

17. A non-transitory machine-readable medium, comprising executable instructions that, when executed by a processor, facilitate performance of operations, comprising:

determining a first transmission resource in a first frequency domain of a carrier and a second transmission resource in a second frequency domain of the carrier; and scheduling a transmission by a user device comprising transmitting a communication to the user device, the communication comprising:
  a first value corresponding to the first frequency domain and a second value corresponding to the second frequency domain, and
  an indication that the first and the second transmission resource are represented in a same time domain.

18. The non-transitory machine-readable medium of claim 17, wherein the determining of the first and the second transmission resources comprises determining that the first transmission resource is available for use by the user device and that the second transmission resource is unavailable for use by the user device.

19. The non-transitory machine-readable medium of claim 18, wherein the operations further comprise, determining that the carrier is deployed in unlicensed spectrum, and wherein the determining the first transmission resource is available for use is initiated based on the carrier being determined to be deployed in the unlicensed spectrum.

20. The non-transitory machine-readable medium of claim 17, wherein transmitting the communication to the user device comprises communicating by employing a downlink control channel.

* * * * *